US005109150A

United States Patent [19]

Rogers

[11] Patent Number: 5,109,150

[45] Date of Patent: Apr. 28, 1992

[54] OPEN-ARC PLASMA WIRE SPRAY METHOD AND APPARATUS

[75] Inventor: Frank S. Rogers, Silverdale, Wash.

[73] Assignee: The United States of America as represented by the Secretary of the Navy, Washington, D.C.

[21] Appl. No.: 415,797

[22] Filed: Oct. 2, 1989

Related U.S. Application Data

[63] Continuation of Ser. No. 24,099, Mar. 24, 1987, abandoned.

[51] Int. Cl.[5] B23K 9/00

[52] U.S. Cl. 219/121.47; 219/121.48; 219/76.16; 219/76.15; 219/121.51; 427/34

[58] Field of Search 219/121.47, 76.16, 76.15, 219/75, 121.59, 121.48, 121.5, 121.51, 121.45; 427/34

[56] References Cited

U.S. PATENT DOCUMENTS

| | | | |
|---|---|---|---|
| 2,982,845 | 5/1961 | Yenni et al. | 219/76.16 |
| 3,830,997 | 8/1974 | Essers et al. | 219/76.16 |
| 4,370,538 | 1/1983 | Browning | 219/121 PY |
| 4,604,306 | 8/1986 | Browning | 219/121 PL |
| 4,668,852 | 5/1987 | Fox et al. | 219/76.16 |
| 4,672,171 | 6/1987 | Cusimano et al. | 219/76.16 |
| 4,762,977 | 8/1988 | Browning | 219/76.16 |
| 4,788,402 | 11/1988 | Browning | 219/121.47 |

*Primary Examiner*—M. H. Paschall

*Attorney, Agent, or Firm*—Kenneth L. Warsh; Robert Wohlfarth

[57] ABSTRACT

The plasma-arc torch is of the type wherein a thermally ionizable gas is directed past a non-consumable cathode electrode and through the constricted orifice of a nozzle. An arc is established between the non-consumable electrode and the nozzle to initiate and sustain a plasma stream through the constricted orifice and then through a final port in a housing. A shield gas is directed around the nozzle and through the final port in the housing. A wire guide/contact tip is used for supporting a positively charged spray wire with a wire alignment fixture for coupling the wire guide/contact tip to the plasma stream outside the final port in the housing, the wire alignment fixture having a first collar section fixed to the torch and a second collar section fixed to the wire guide/contact tip.

5 Claims, 8 Drawing Sheets

OPEN-ARC PLASMA WIRE SPRAY METHOD AND APPARATUS

This application is a continuation of application Ser. No. 024,099, filed Mar. 24, 1987 now abandoned.

BACKGROUND OF THE INVENTION

1. Field of the Invention

This invention relates in general to metal spray methods and apparatus and, in particular, to a plasma-arc spray method and apparatus employing a transferred arc between a non-consumable electrode and a consumable spray material. This invention is especially applicable to producing high quality plasma type thermal spray coatings when employing a wire as the consumable spray material.

2. Description of Prior Art

The process of thermal metal spraying has been performed for many years with various methods being used to melt materials and propel molten particles onto a substrate. Present metal spraying systems include fuel-/oxygen systems, electric arc systems (non-plasma arc), and the non-transferred arc plasma system that melts powder in a hot gas stream and propels it to the substrate.

In the electric arc systems, two consumable feed wires are fed from a spray gun along intersecting paths. Current is applied to create an arc between the wires that melts the wires at their point of intersection. High velocity compressed air is discharged on the molten metal to produce atomized molten metal that is projected onto a workpiece. A primary problem with electric arc systems has been equipment failure and shut down upon the feed wires becoming shorted or welded together during metal spraying operations. In addition, these systems have been bulky and heavy which renders them difficult to use in confined spaces such as encountered in the shipbuilding and ship repair industries.

The plasma arc process known in welding, cutting and thermal spraying is a process in which heat is produced by a constricted arc between a non-consumable tungsten electrode and a workpiece (called a transferred arc), or between a non-consumable tungsten electrode and a constricted orifice (called a non-transferred arc). In the plasma arc process, a gas is ionized into a plasma state when it is passed through an arc which is established between two oppositely polarized electrodes. The plasma section of the arc is kept extremely hot by the resistance heating effect of the current passing through it.

Present plasma thermal spray systems are generally of the non-transferred arc type. The arc is established between a non-consumable tungsten electrode and a non-consumable body which contains an orifice through which the plasma leaves the region of the arc. A powder is added to the hot plasma gas stream as it leaves the orifice. This powder is melted and molten droplets are propelled onto a workpiece. The plasma powder spray process produces high quality spray coatings but requires the use of more expensive powder as the spray material and a complicated spray powder feed mechanism.

U.S. Pat. No. 2,982,845 by D. N. Yenni et al. and U.S. Pat. No. 4,370,538 by James A. Browning disclose metal spray systems in which a transferred arc is established between an electrode and a single spray wire. In these examples (in Browning see FIG. 5), flow of the ionizable gas from a gas source is established through the constricted orifice. A low current non-transferred pilot arc is established between the cathode electrode and the positively-polarized constricted orifice of the primary nozzle. The pilot arc heats and ionizes the primary gas into the plasma state, producing a plasma stream from the primary nozzle. The arc then transfers to the more positively-polarized spray wire through the conductive plasma stream. When the transferred arc has been established, the pilot arc may be interrupted. In Browning, the spray wire is disposed inside a diverging-/converging inner bore which is disposed downstream from the constricted orifice. The diverging/converging inner bore is in turn disposed upstream of an exit bore. Thus the transferred arc process occurs within a first diverging/converging bore and the atomized metal spray produced thereby is directed through a second bore to the spray target. A secondary jet in the form of combustion products of an air/fuel burner is directed into the exit bore to accelerate the metal spray. In Yenni et al., the spray wire is also disposed at the upstream end of a confining chamber. In both of these designs, the confining chambers create the possibility of spray material clogging the nozzle and thus enhances the danger of clogging.

SUMMARY OF THE INVENTION

It is therefore an object of the present invention to provide an improved metal spraying process and apparatus.

Another object is to provide a process and apparatus for producing high quality plasma type thermal spray coatings.

Another object is to provide a process and apparatus for producing high quality plasma type thermal spray coating using economical spray materials.

Still another object is to provide a process and apparatus for producing high quality plasma type thermal spray coating using wire as the spray material.

Another object is to provide a plasma type thermal spray process and apparatus that has operational simplicity, comparable quality of coatings, and greater economy when compared to the plasma powder process.

Another object is to provide a wire spray process and apparatus that does not experience problems related to shorting of the spray wire.

A further object is to adapt a commercially available plasma-arc cutting torch and a wire guide/contact tip to provide a plasma-arc spray apparatus producing high quality plasma type thermal spray coatings.

Yet another object is to provide an improved plasma arc spray apparatus employing a secondary atomizing nozzle for producing a finer spray at a higher velocity to provide a higher quality coating.

A further object is to provide an improved plasma arc spray apparatus in which the plasma arc is established to a spray wire disposed outside any nozzle.

Still another object is to provide an improved plasma arc spray apparatus in which the plasma arc is established outside the primary plasma nozzle and in which the wire guide contact tip are contained in the same body as the torch head.

A still further object is to provide the foregoing objects in a portable apparatus which is suitable for use in confined spaces such as encountered in the shipbuilding and ship repair industries.

These objects and others are provided by a plasma-arc thermal spray process and apparatus of the transferred-arc type. In the present invention, a transferred arc is established between the electrode of a plasma-arc torch (such as a plasma arc cutting torch) and a spray wire disposed externally to the primary plasma nozzle of the torch. The spray wire is continuously fed into the arc where it is melted and propelled as a spray stream of atomized metal onto a workpiece by the force of the arc and the ionized gas. Since the arc between the spray wire and the electrode is struck outside the plasma nozzle, any possibility of the nozzle clogging with spray material is eliminated. A unified torch body is disclosed in which the wire support is contained in the same body as the plasma nozzle. In two alternate embodiments, the transferred arc is struck to a spray wire disposed near the outlet of a secondary nozzle and a secondary atomizing gas is directed into the spray stream to further atomize the already atomized material into a finer spray.

Other objects and many of the attendant advantages will be readily appreciated as the present invention becomes better understood by reference to the following detailed description when considered in conjunction with the accompanying drawings wherein:

DESCRIPTION OF THE PREFERRED EMBODIMENTS

Figure 1:
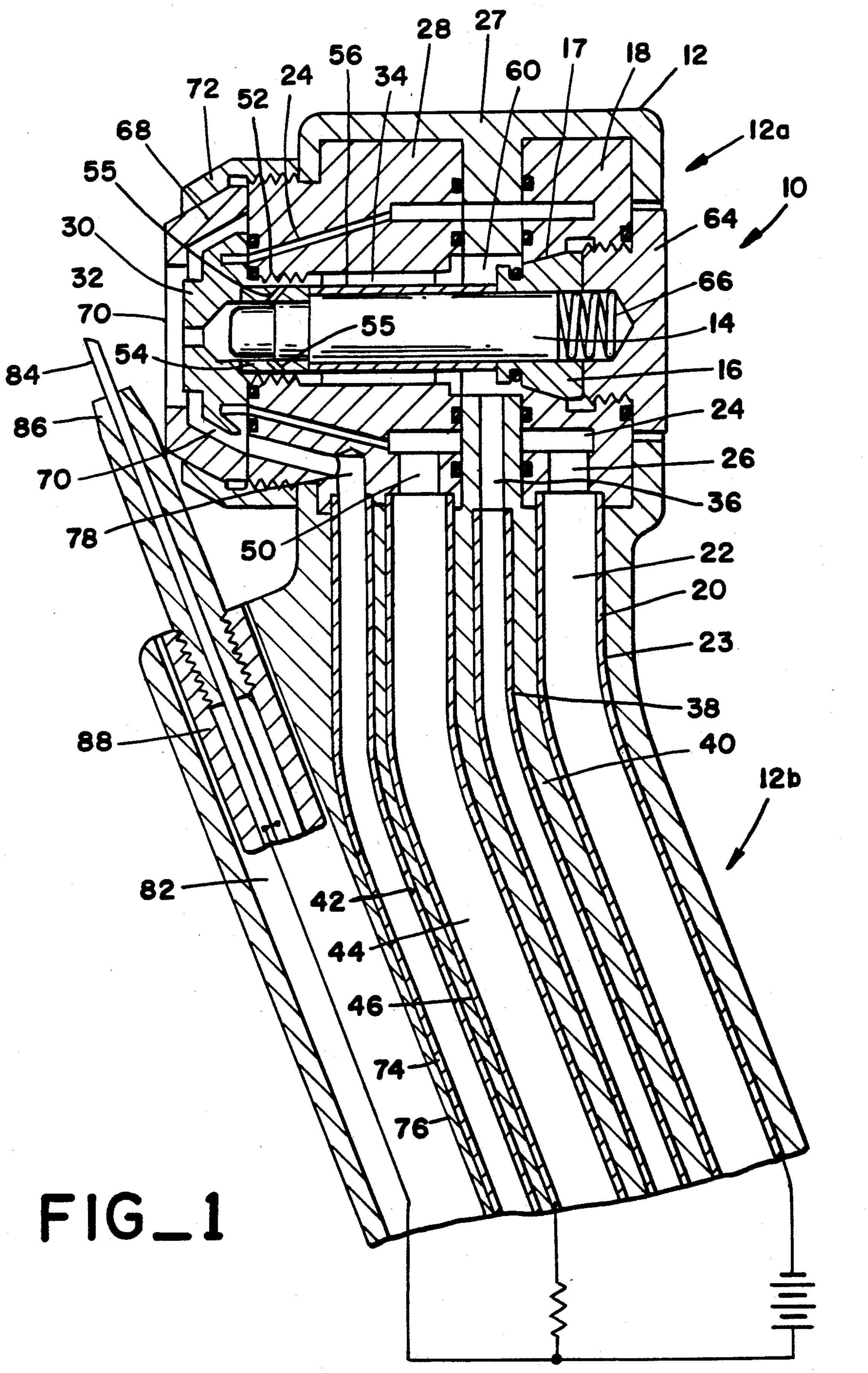
FIG. 1 is a cross-sectional view of an open-arc plasma wire apparatus in which the spray wire guide and the contact tip are integral with the torch body.

Referring now to the drawings, wherein like reference characters designate like or corresponding parts throughout the several views, FIG. 1 illustrates an open arc plasma wire spray apparatus according to the present invention employing a unified torch structure 10 in which a spray wire guide and a plasma torch are contained in a unified torch body 12 having a torch head portion 12*a* and a handle portion 12*b*. The plasma torch 10 includes a tungsten cathode electrode 14 disposed centrally within the electrically insulating torch body 12. The upper surface (the terms herein indicating relative position such as upper and lower are related to the orientation of the apparatus as viewed in the Figure being referred to) of the electrode 14 is disposed interior to and in electrical and mechanical contact with the inner surface of an electrode power transfer ring 16.

The electrode power transfer ring 16, which couples the negative polarity electrical power to the electrode 14, has an upper section having an outer conical surface 17. The electrode power transfer ring 16 is in turn disposed interior to and in electrical and mechanical contact with an electrode power distribution ring 18. The electrode power distribution ring 18 has a portion of its inner surface in contact with the outer conical surface 17 for coupling negative polarity power to the electrode power transfer ring 16 and its outer surface disposed within the torch body 12.

The electrode power distribution ring 18 is coupled to a tubular power lead 20. The tubular power lead 20 supplies the negative polarity electrical power through the cylindrical tube wall to the power distribution 18 ring and provides a central channel 22 for coupling cooling fluid to the torch head 12*a* for removing heat generated during operation of the torch. The central channel 22 serves as a coolant return line in the illustrated embodiment. The tubular power lead 20 is disposed in a cylindrical bore 23 in the handle 12*b* of torch body 12. The various elements of the torch head 12*a* have interconnecting chambers and channels (not individually numbered) to provide a coolant conduit 24 allowing cooling fluid to flow through the head. The power distribution ring 18 is provided with a coolant port 26 communicating between the coolant conduit 24 and the coolant return line provided by the central channel 22 of the power lead 20.

The body 12 of the torch has a flange 27 which separates the electrode power distribution ring 18 from a nozzle power distribution ring 28. The nozzle power distribution ring couples positive polarity power to a primary plasma nozzle 30 having a primary plasma port 32. The nozzle power distribution ring 28 is disposed such that the electrode 14 is interior to but spaced from the nozzle power distribution ring to form an annular channel 34 around the electrode 14 below the electrode power transfer ring 16. The annular channel 34 provides a distribution channel for the primary gas. The torch body 12 is provided with a primary gas port 36 in the region between the electrode power distribution ring 18 and the nozzle power distribution ring 28 for introducing the primary gas into the primary gas distribution channel 34. A primary gas line 38 for supplying primary gas to port 36 is disposed in a cylindrical bore 40 in the handle 12*b* of torch body 12.

The nozzle power distribution ring 28 is coupled to a second tubular power lead 42 which couples positive polarity electrical power through the cylindrical tube wall to the nozzle power distribution ring and provides a central channel 44 for coupling cooling fluid to the torch head. The central channel 44 serves as a coolant supply line in the illustrated embodiment. The tubular power lead 42 is disposed in a cylindrical bore 46 in the handle 12*b* of torch body 12. The nozzle power distribution ring 28 is provided and with a coolant port 50 communicating between the coolant conduit 24 and the coolant supply line provided by central channel 44 of the power lead 42.

The primary nozzle 30 is electrically and mechanically coupled to the lower section of the nozzle power distribution ring 28 by a threaded collar section 52 which Joins the lower inside surface of the nozzle power distribution ring. The nozzle 30 and the electrode 14 have opposing annular ledges(unnumbered) for retaining an insulating annular spacer 54 which positions the tip of the electrode precisely relative to the nozzle 30 and also electrically isolates the side walls of the electrode from the nozzle and from the nozzle power distribution ring 28. The spacer 54 has grooves 55 (best shown in FIG. 2) allowing the primary gas to flow from the gas distribution channel 34 into the nozzle 30. A cylindrical insulator 56 is disposed adjacent to the electrode 14 in the annular channel 32 above the insulating spacer to electrically insulate the nozzle power distribution ring 28 from the remainder of the side walls of the electrode. The electrode 14 is fixed in place with the ledge (unnumbered) maintained against the insulating spacer 54 by an electrode retainer 64 and a retaining spring 66. The electrode retainer 64, which is threadedly coupled to the electrode power distribution ring 16, has a central cavity containing the retaining spring 66 which maintains the electrode 14 against the insulating spacer 54. The base of the electrode retainer 64 abuts the top of the electrode power transfer ring 16 to maintain the electrode power transfer ring against the sloping side of the electrode power distribution ring 18. A shield gas distribution ring 68 of insulating material and having a shield gas port 70 is disposed outside of and spaced from the nozzle 30. The ring 68 is held in place by an insulating retainer ring 72 which is threadably attached to the nozzle power distribution ring 28. The torch body 12 is provided with a bore 74 adapted to contain a shield gas line 76. The shield gas is directed through a shield gas line 74 disposed in bore 76 in the torch handle **12*b* to a shield gas port 78 in the nozzle power distribution ring 28 From the shield gas port 78, the shield gas is directed through the shield gas distribution channel 80 in the annular space between the nozzle 30 and the shield gas distribution ring 68**.

The handle **12*b* of the torch body 12 includes a channel 82 for supporting a consumable spray wire 84 The spray wire 84, which is coupled to the positive polarity power, is supported in an insulating contact tip 86 which is threadably attached to a contact tip holder 88 which is disposed in the channel 82. The contact tip holder 88 and the channel 82 can be adapted to allow a cooling gas to be directed through the channel 82 and over the contact tip holder to cool the contact tip holder and contact tip (as is the case in FIG. 1). The channel 82 in the body of the torch is oriented to provide a straight line feed for the spray wire 84. In the embodiment of FIG. 1, the spray wire 84 is fed at an acute angle of entry of approximately 70 degrees relative to the plasma flame exiting from nozzle 30. The optimum angle of entry is between 90 degrees (perpendicular to the nozzle 30) and an acute angle of 30 degrees with the plasma flame depending on the actual application. It is obvious that the design of the handle 12*b*** could easily be adapted to provide any angle of entry within this range or greater.

Figure 2:
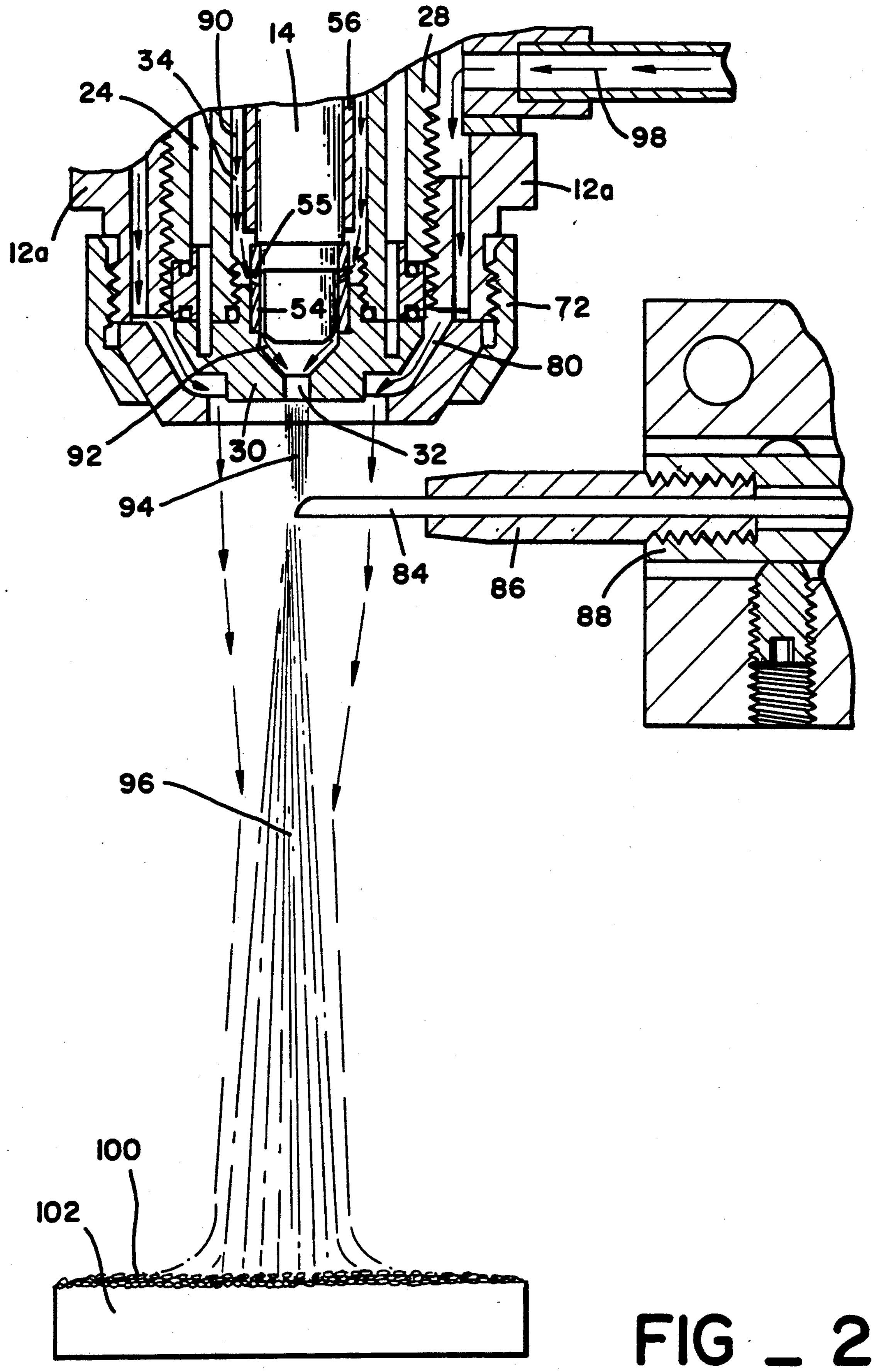
FIG. 2 is a cross-sectional view illustrating the open-arc plasma wire spraying method.

FIG. 2 illustrates the operation of the open-arc plasma wire spray apparatus such as shown in the embodiment of FIG. 1. The embodiment illustrated partially in FIG. 2 does not employ the unitary structure of the torch and wire feed mechanism of the embodiment of FIG. 1, but the open-arc operation is the same. The primary gas represented by arrows 90 (FIG. 2) is directed from an external source (not shown) through the primary gas conduit 38 and through the primary gas port 36 into the annular channel 34 surrounding the electrode 14. The primary gas then flows downward through the primary gas distribution channel 34 and through the grooves 55 in the insulating spacer 54 into the channel 92 between the nozzle 30 and the electrode 14 and out of the constricted nozzle port 32. A pilot arc is established in the gas flow between the end of the electrode and the front of the nozzle. The pilot arc heats and ionizes the primary gas as it passes through the channels and out of the nozzle port 32 producing a plasma flame column 94. The arc then transfers through the conductive plasma flame column 94 to the more positively polarized spray wire 84. The spray wire 84 is continuously fed into the arc (plasma flame column 94) where it is melted and propelled as a spray stream 96 of atomized spray metal 100 onto a workpiece 102 by the force of the arc and the ionized gas. When the transferred arc has been established between the electrode 14 and the spray wire 84, the pilot arc may be interrupted.

A shield gas may be directed, as indicated by the dotted arrows 98, through the various channels to exit through the shield gas distribution channel 80. The use of a shield gas, which is optional to the operation of the open arc plasma wire system, assists in the columnizaton of the spray pattern and also shields the operation from the atmosphere.

In the present embodiment, the arc between the electrode 14 and the spray material, spray wire 84, is struck to a spray wire that is disposed outside the plasma nozzle 30 and not within any other nozzle or confining structure (as opposed to the conventional case where the spray wire is disposed inside the primary nozzle or within another structure). This eliminates any possibility of the nozzle 30 clogging with spray material. With the arc struck to a spray wire 84 disposed outside of the plasma nozzle 30, the wire feed rate is not critical to prevent clogging. In addition, the amount of wire 84 extending from the contact tip 86 and the arc distance from the nozzle 30 to the wire 84 can each be readily adjusted for optimum performance.

Figure 3:
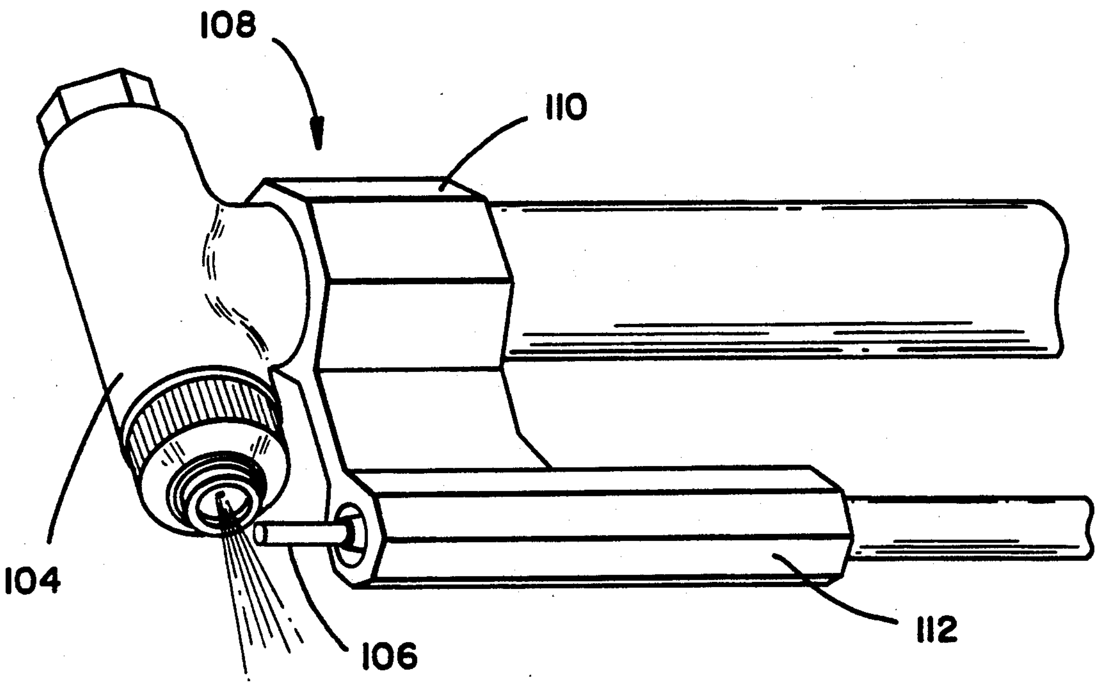
FIGS. 3 and 4 show a simplified method of system manufacture where a commercially available torch is coupled by a wire alignment fixture to a wire guide/contact tip to provide an open-arc plasma spray apparatus.

FIG. 3 illustrates a method of adapting a standard commercially-available plasma cutting torch 104 and a wire guide/contact tip 106 to provide an open-arc plasma wire torch as contemplated by the present invention. The commercial plasma torch 104, a 90 degree hand cutting torch (PMC-51A manufactured by Thermal Dynamics Corporation in this case) and a wire guide/contact tip 106 are joined by a wire alignment fixture 108. The wire alignment fixture 108 has a first collar section 110 fixed to the handle of the torch 104 and a second collar section 112 supporting the wire guide/contact tip 106 in the desired spaced relationship with the torch nozzle.

Figure 4:
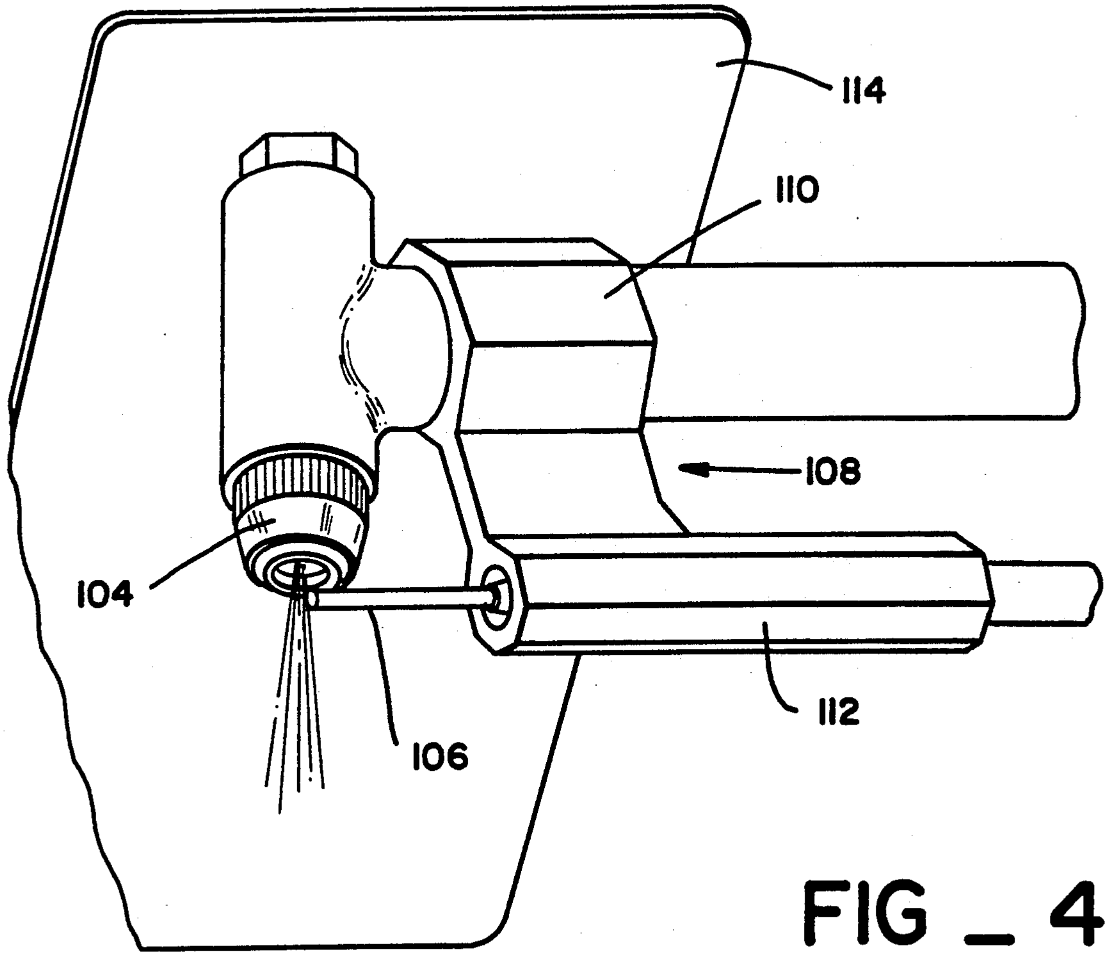
Figure 5:
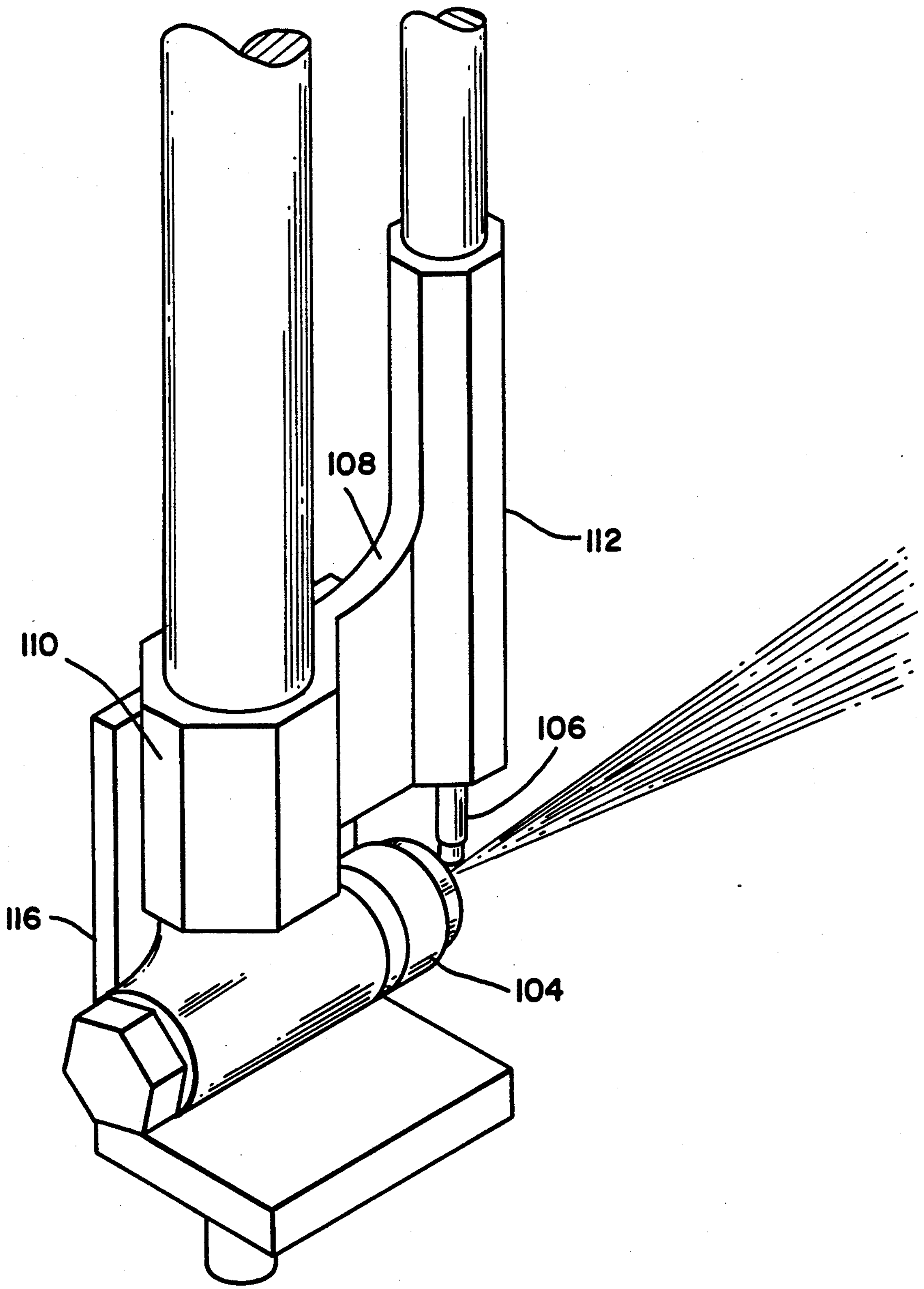
FIG. 5 shows a torch joined to a wire guide/contact tip by a wire alignment fixture which is attached to a tool post attachment device for holding the plasma wire apparatus during spraying.
Figure 6:
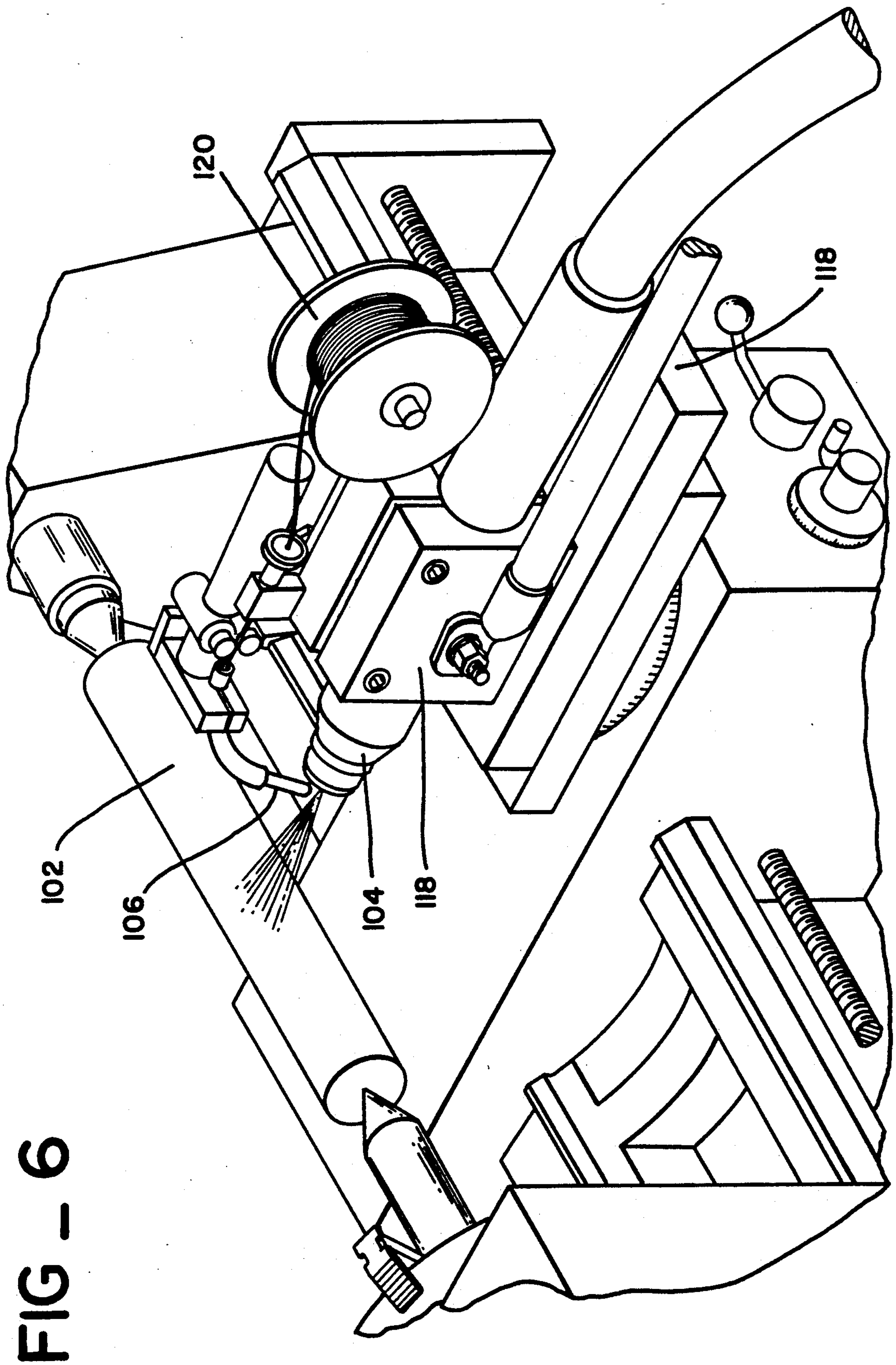
FIG. 6 illustrates a mounting concept wherein a straight plasma torch and wire feed apparatus are mounted to a lathe tool post.

FIG. 4 illustrates a similar wire alignment fixture **108*a* for supporting a wire guide-contact tip 106 in the desired spaced relationship with a 70 degree hand held cutting torch 104*a* and also illustrates a transparent shield 114 to protect the operator from the open arc. FIG. 5 shows a ninety-degree plasma wire spray apparatus with the alignment fixture 108 attached to a tool post attachment 116 for mounting the plasma torch 104 and the wire guide/contact tip 106 on a lathe or other device for holding the torch during spraying. FIG. 6 shows a straight plasma torch 104, a wire feed motor 118, a wire guide/contact tip 106, and a small wire spool 120, all mounted to a lathe tool post 118 for spraying a workpiece 102**.

Figure 7:
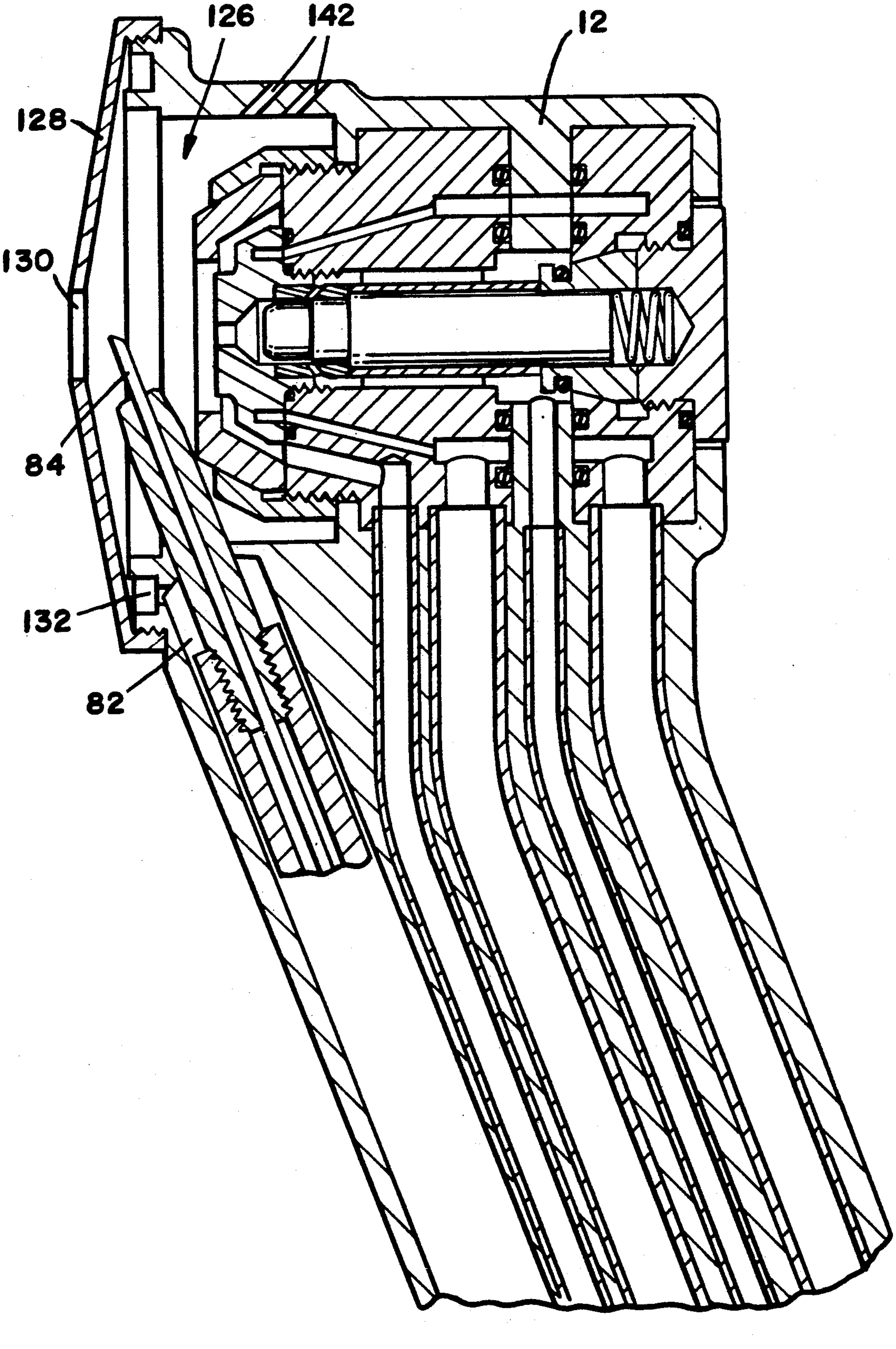
FIG. 7 is a cross-sectional view of an open-arc plasma wire apparatus having secondary atomization wherein the open arc is established inside a pressurized chamber and with the wire positioned near to the outlet of the pressurized chamber.

Referring now to FIG. 7, an alternative embodiment is shown where the open arc is established inside a pressurized chamber 126. The spray wire 84 is positioned close o the outlet of the pressurized chamber 126. The embodiment of FIG. 7 is identical to the embodiment of FIG. 1 except that the body 12 is adapted to support a secondary atomizing nozzle 128 having an outlet port 130. The pressurized chamber 126 is formed within the secondary atomizing nozzle 128. The secondary atomizing nozzle 128 is disposed outside of the spray wire 84 so that the plasma arc is struck within the secondary atomizing nozzle. The spray wire 84 is disposed close to the outlet port 130 of the secondary atomizing nozzle 128 in order to minimize the possibility of clogging and at the same time have the operating function as close to an open arc operation as is practicable within the pressure chamber. The chamber 82 for the spray wire 84 is coupled to an annular secondary atomizing gas distribution chamber 132 in the body 12. The wire cooling gas flows from the wire channel 82 into the secondary atomizing gas distribution chamber 132 to pressurized chamber 126. The plasma flame, the already formed spray droplets, and the pressurized gases all converge and exit the outlet pot 130. This increases the velocities of the effluent and further atomizes the spray droplets into a finer spray.

Figure 8:
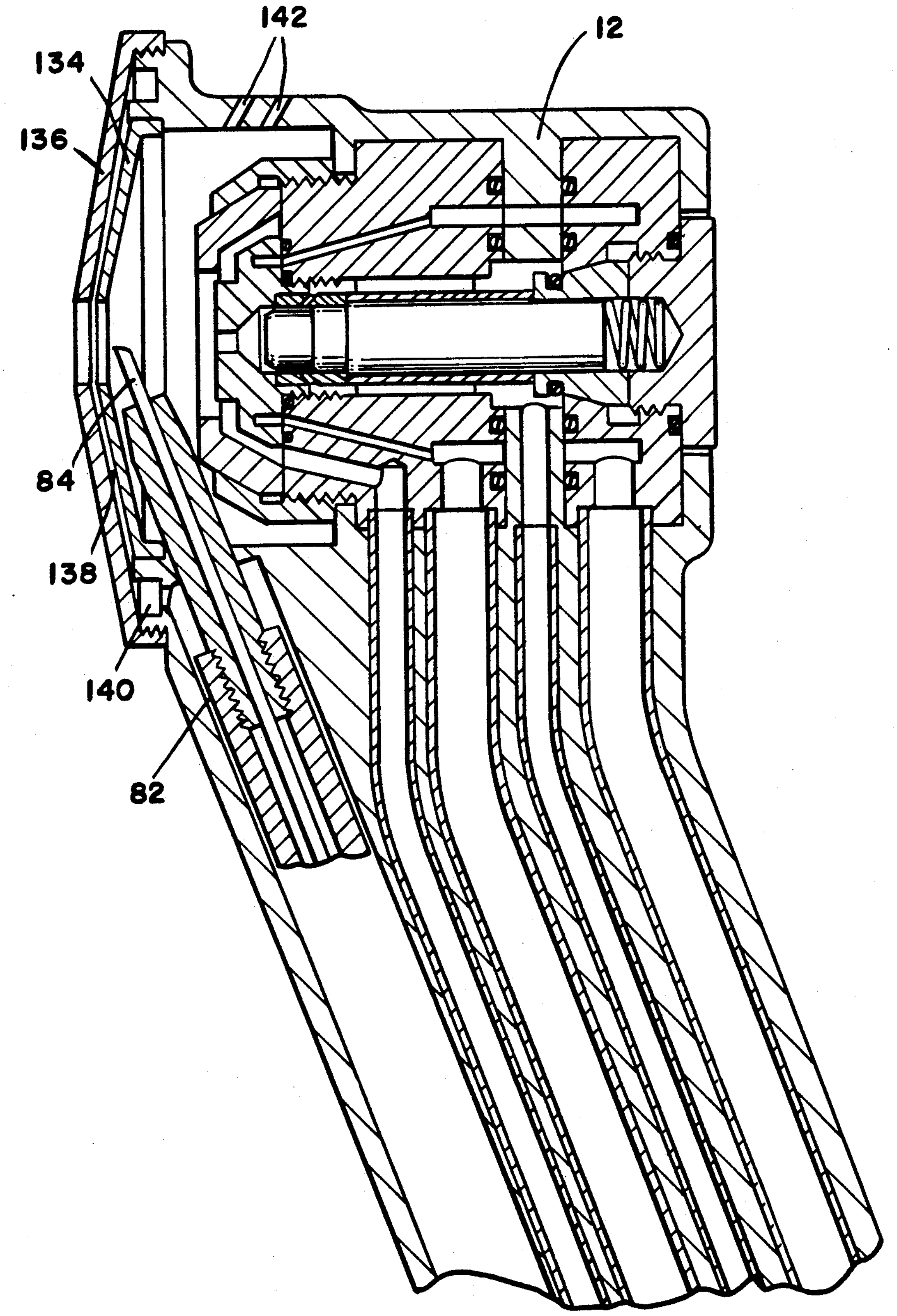
FIG. 8 is a cross-sectional view of an open-arc plasma wire apparatus wherein having secondary atomization wherein the internal chamber need not be pressurized.

FIG. 8 illustrates a second alternate embodiment which utilizes secondary atomization. In the embodiment of FIG. 8, the body 12 is adapted to support a secondary atomizing nozzle formed by an inner nozzle distribution ring 134 and an outer nozzle distribution ring 136. A narrow secondary-atomizing-gas distribution chamber 138 is formed between the inner and outer distribution rings. The body 12 of the torch has an annular port 140 connecting the channel 82 supporting the spray wire to the secondary-atomizing-gas distribution chamber 116. The annular port 140 coupled the cooling gas to the secondary-atomizing-gas chamber to allow the spray wire cooling gas to function as the secondary atomizing gas. The narrow secondary-atomizing-gas distribution chamber 138 in the two piece secondary atomizing nozzle provides a high velocity gas that impinges on the already atomized material and further breaks it down into a finer spray. The width of the narrow chamber 138 and the angle of the impinging gas can be designed to select the degree of atomization desired.

The embodiment of FIG. 8 uses much less secondary atomizing gas than the embodiment of FIG. 7. In addition nozzle clogging is reduced, thus allowing the use of a larger primary plasma nozzle outlet 32 which in turn allows the use of larger diameter spray wires. The inner chamber 126 can be pressurized through use of the secondary shield gas or be held ambient. The exiting gases cause a vacuum in the internal chamber. The gases can be replaced through holes to the atmosphere such as holes 142 in FIGS. 7 and 8 or by an auxiliary supply such as the secondary shield gas.

Figure 9:
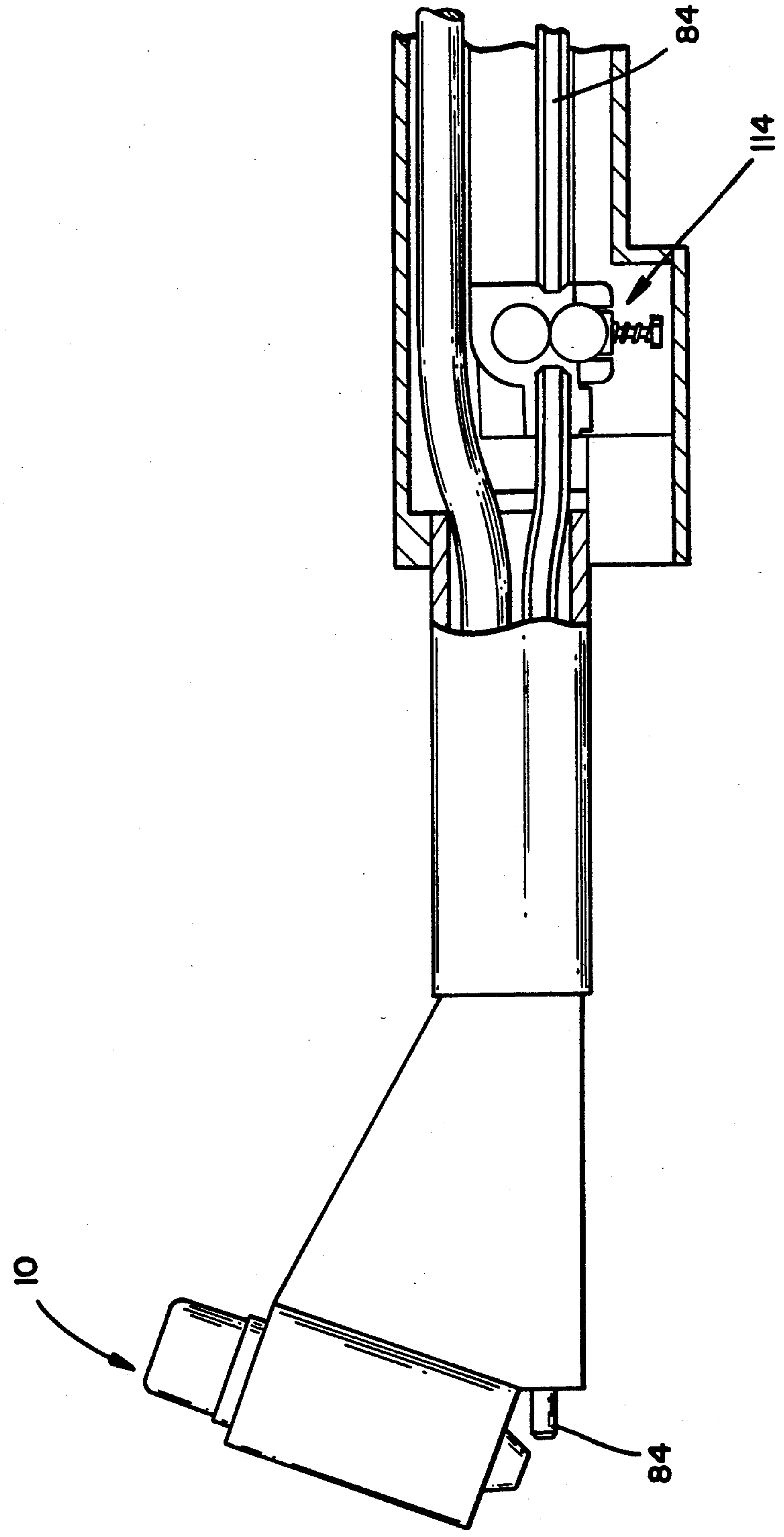
FIG. 9 illustrates a hand held torch with a wire feed motor in the handle.

In the embodiments illustrated in FIGS. 1, 7, and 8, the wire guide and contact tip are contained with the plasma torch in a common body 12. This allows a lower weight, more compact torch for accomplishing hand-held operation and for operation in more restricted work spaces. This common-body design provides comfortable hand-held operation and allows angle spraying for items such as internal bores. With the wire guide and the power leads of the torch contained in the handle, straight through feed of wire reduces sliding resistance, tip wear, and allows a smoother wire feed. The wire feed mechanism can be contained inside the handle 12*a* or fed to the torch via a wire liner from an auxiliary feeder. FIG. 9 shows a hand-held torch 10 with a wire feed motor 144 in the handle of the torch. This type of arrangement usually provides a smoother wire fed and also provides longer leads from the wire spools.

It is noted that the present invention has been described with a structure (FIGS. 1, 7 and 8 in particulars) most appropriate for a liquid-cooled torch; however, it will be recognized that the present invention is equally applicable for use with a gas-cooled torch design, for example, where the primary gas and/or shield gas may be used as the coolant.

Obviously, many modifications and variations of the present invention are possible in light of the above teachings. It is therefore to be understood that within the scope of the appended claims, the invention may be practiced otherwise than as described.

What is claimed and desired to be secured by letters patent of the United States is:

1. Open-arc plasma wire spray apparatus comprising:

a plasma-arc torch of the type wherein a thermally ionizable gas is directed past a non-consumable cathode electrode and through the constricted orifice of a nozzle and wherein an arc is established between the non-consumable electrode and the nozzle to initiate and sustain a plasma stream through said constricted orifice and then through a final port in a housing;

means for directing a shield gas around said nozzle and through said final port in the housing;

a wire guide/contact tip for supporting a positively charged spray wire; and a wire alignment fixture for coupling said wire guide/contact tip to said plasma-arc torch so that the tip of said spray wire is disposed in aid plasma stream outside said final port in the housing, said wire alignment fixture having a first collar section fixed to said torch and a second collar section fixed to the wire guide/contact tip.

2. An open-arc plasma wire spray torch body having a head section and a handle section of the type wherein a thermally ionizable gas is directed past a non-consumable electrode and through the constricted orifice of a primary nozzle and wherein an arc is established between the non-consumable electrode and the primary nozzle to initiate and sustain a plasma stream through said constricted orifice comprising:

a central cathode electrode;

first means for coupling negative electrical power to said central electrode; a primary plasma nozzle having a constricted outlet port;

first means for coupling positive electrical power to said primary plasma nozzle, said positive electric power being coupled through a resistance to reduce the potential at said primary plasma nozzle;

means for directing said thermally ionizable gas past said electrode and through said orifice;

second means for coupling negative electrical power to said first means for coupling negative electrical power;

second means for coupling positive electrical power to said first means for coupling positive electric power;

means for coupling the thermally ionizable gas to said head section;

means for supporting a spray wire in front of said constricted outlet port of said primary plasma nozzle in said plasma stream, said spray wire being coupled to positive electric power, said means for supporting a spray wire including a bore in said handle section, a wire guide/contact tip being disposed in said bore, said spray wire being disposed in said wire guide/contact tip, said bore being adapted to allow a gas under pressure to be directed through said bore to cool said wire;

a chamber surrounding the constricted outlet port, the tip of said spray wire being disposed within said chamber, said cooling gas being directed from said bore into said chamber to provide a secondary atomizing gas;

means for directing a gas under pressure into said chamber to provide a second gas; and said means for providing a chamber including a secondary atomizing nozzle having an outlet port.

3. Apparatus as recited in claim 2 wherein said secondary atomizing nozzle includes:

an inner nozzle distribution ring;

an outer nozzle distribution ring, said inner nozzle distribution ring and said outer nozzle distribution ring forming a secondary atomizing gas distribution chamber for directing said cooling gas from said bore into said secondary atomizing nozzle.

4. An improvement in metal spray apparatus of the type employing a transferred arc between a non-consumable electrode supported in a housing channeled for the streaming of plasma gases at a target and consumable spray material wherein the improvement comprises:

means for introducing the consumable spray material in the form of a wire into the plasma stream outside the housing channeled for the streaming of plasma gases, and means for gas cooling said means for introducing the consumable spray material.

5. Open-arc plasma wire spray apparatus comprising:

a plasma-arc torch of the type wherein a thermally ionizable gas is directed past a non-consumable cathode electrode and through the constricted orifice of a nozzle and wherein an arc is established between the non-consumable electrode and the nozzle to initiate and sustain a plasma stream through said constricted orifice and then through a final port in a housing;

means for directing a shield gas around said nozzle and through said final port in the housing;

a wire guide/contact tip for supporting a positively charged spray wire; and a wire alignment fixture for coupling said wire guide/contact tip to said plasma-arc torch so that the tip of said spray wire is disposed in said plasma stream outside said final port in the housing, and means for gas cooling said wire, said wire guide/contact tip and said wire alignment fixture.

* * * * *